US009300409B1

(12) United States Patent
Leugoud et al.

(10) Patent No.: US 9,300,409 B1
(45) Date of Patent: Mar. 29, 2016

(54) ROTATIONAL ELECTROCHEMICAL SEISMOMETER USING MAGNETOHYDRODYNAMIC TECHNOLOGY AND RELATED METHODS

(75) Inventors: Robert Leugoud, Kirkwood, MO (US); Alexei Alexei Kharlamov, Moscow (RU)

(73) Assignee: eentec, LLC, Kirkwood, MO (US)

( * ) Notice: Subject to any disclaimer, the term of this patent is extended or adjusted under 35 U.S.C. 154(b) by 740 days.

(21) Appl. No.: 13/564,364

(22) Filed: Aug. 1, 2012

Related U.S. Application Data

(60) Provisional application No. 61/513,969, filed on Aug. 1, 2011, provisional application No. 61/601,395, filed on Feb. 21, 2012.

(51) Int. Cl.
*G01V 1/18* (2006.01)
*H04B 17/00* (2015.01)

(52) U.S. Cl.
CPC .................................... *H04B 17/004* (2013.01)

(58) Field of Classification Search
CPC ...... G01P 15/006; G01V 1/18; B81B 3/0035; B81B 3/0062; B81B 3/0081; B81B 3/0086; B81B 3/0091
USPC ........................................................ 367/140
See application file for complete search history.

(56) References Cited

U.S. PATENT DOCUMENTS

| 5,182,947 | A | * | 2/1993 | Fidelak et al. | 73/304 C |
| 5,237,872 | A | * | 8/1993 | Rademakers | 73/504.07 |
| 6,204,499 | B1 | * | 3/2001 | Schaefer | 250/231.1 |
| 6,382,025 | B1 | * | 5/2002 | Hunter | 73/514.03 |
| 6,453,745 | B1 | * | 9/2002 | Jalkanen | 73/514.09 |
| 7,171,853 | B1 | * | 2/2007 | Laughlin | 73/514.03 |
| 7,280,936 | B1 | * | 10/2007 | Swope et al. | 702/151 |
| 2005/0132798 | A1 | * | 6/2005 | Lee et al. | 73/504.02 |
| 2005/0257616 | A1 | * | 11/2005 | Kozlov et al. | 73/514.16 |
| 2010/0116053 | A1 | * | 5/2010 | Kozlov et al. | 73/514.16 |

FOREIGN PATENT DOCUMENTS

| EP | 0445441 A1 * | 9/1991 | |
| WO | WO 2011/017604 A1 * | 2/2011 | G01C 19/12 |

OTHER PUBLICATIONS

Grayzer, V. M., "Inertial Seismometry Methods," Izvestiya, Earth Physics, vol. 27, No. 1, pp. 51-61, 1991, 11 pages.
Takeo, Minoru and Ito, Hidemi M., "What can be learned from rotational motions excited by earthquakes?" Geophys. J. Int., 129, pp. 319-329, 1997, 11 pages.
Pillet, Robert and Virieux, Jean, "The effects of seismic rotations on inertial sensors," Geophys, J. Int. 2007, 10 pages.
Safak, Erdal, "Significance of Rotational Motion in Structures," 7 pages.

* cited by examiner

*Primary Examiner* — Luke Ratcliffe
*Assistant Examiner* — Amienatta M Ndure Jobe
(74) *Attorney, Agent, or Firm* — Lewis Rice LLC

(57) ABSTRACT

Systems and methods are provided for an electrochemical rotational sensor suitable for use in seismic applications that includes a magnetohydrodynamic (MHD) calibrator. The systems and methods allow for a rotational sensor to utilize a smaller toroid electrolyte channel and to be calibrated in a bandpass range of 100 seconds or 100 Hz.

8 Claims, 4 Drawing Sheets

ROTATIONAL ELECTROCHEMICAL SEISMOMETER USING MAGNETOHYDRODYNAMIC TECHNOLOGY AND RELATED METHODS

CROSS REFERENCE TO RELATED APPLICATION(S)

This application claims benefit of U.S. Provisional Application Ser. No. 61/513,969, filed Aug. 1, 2011 and U.S. Provisional Application Ser. No. 61/601,395 filed Feb. 21, 2012. The entire disclosure of both documents is herein incorporated by reference.

BACKGROUND OF THE INVENTION

1. Field of the Invention

This disclosure relates to the field of detection of rotational motion. Specifically, to rotational seismometers and methods for using and calibrating them.

2. Description of Related Art

The prompt detection of earthquakes and other seismic events has gained interest in recent years. As the world has become more populated, the possibility of seismic events effecting population centers has become greater. In order to both detect seismic events, and to study seismic events for future preparation, it is necessary to use appropriate instrumentation. Originally, it was believed that the motion of an earthquake was primarily translational. However, recent learning, and an improvement in available instrumentation, has shown that rotational movement components, particularly near the epicenter of a seismic event, may actually be more important.

In part because of these realizations, the last years have witnessed revolutionary changes in rotational seismology resulting from the combinations of greatly enhanced capabilities of geophysical instrumentation and the appearance of first commercially available rotational seismometers. Such sensors could be employed in areas of high seismicity, where the translational and rotational motions have comparable orders of magnitude. This is especially true for the near zones of strong shallow earthquakes. The measurement of this frequently observed rotational motion in the vicinity of the epicenters of strong earthquakes can be extremely valuable in earthquake engineering, since buildings and other structures have been discovered to generally be quite vulnerable to the torsional stresses created by rotational motions.

A variety of angular sensors are commercially available to detect rotational motion. Some of these feature quite excellent resolution, and offer a frequency band extending into the dc range. Rather than being true rotational seismometers, however, such devices are actually very low frequency accelerometers that measure the tilt of their foundation relative to the local gravity vector. Since gravity is indistinguishable from any other inertial acceleration, these instruments are inherently incapable of separating pure rotation from horizontal accelerations.

A natural method of measuring "pure rotations" would be to use two identical vertical seismometers placed a certain distance from each other, so that the rotational motion can be derived from the difference between the two outputs. Interestingly enough, the concept for a pendulum-based rotational seismometer and its use to correct horizontal seismic signals were put forward a century ago by the Prince Boris B. Golitsyn.

However, starting with Golitsyn's early experiments, and in many subsequent attempts, the resolutions attained by the proposed methods were very poor, since even the smallest differences between the two instruments can lead to large errors. Indeed, it was shown that in order to achieve a tilt measurement accuracy of even $10^{-7}$ rad, the maximum acceptable difference between the two seismometer's characteristics must be about $10^{-4}$%, a consistency which is practically impossible to realize.

There are also a few "true" rotational sensors that are currently known. That is, sensors which measure angular motion and are generally insensitive to translational accelerations. The best known and most accurate types are: Magnetohydrodynamic Angular Rate Sensors where the typical passband is 0.5-1000 Hz. Further, angular resolution at the low cutoff frequency is $\sim 1.6 \cdot 10^{-7}$ rad. As it is unlikely that this device's passband can be extended even to a period of 100 sec, these types of devices have generally been considered unusable for seismic use.

Alternatively, MEMS-based gyroscopes and fiber optic rate gyroscopes put out a signal proportional to the angular velocity in the 0 to 100 Hz band, with a resolution of about $10^{-5}$ rad/sec. The instrument's sensitivity to translational acceleration is specified as $10^{-4}$ rad/sec/g, which is orders of magnitude less than the desired value for seismic applications. Further, MEMS-based systems, in particular, provide limited short term stability (0.05°/sec over 100 sec at constant temperature) and long term stability (1°/sec over 1 year) which are inadequate for seismic applications.

SUMMARY OF THE INVENTION

For these and other reasons known to those of ordinary skill there are described herein electrochemical rotational sensors which utilize magnetohydrodynamic (MHD) technology for calibration and are suitable for seismic applications.

Described herein, among other things, is a seismometer comprising: a rotational sensor comprising: a toroidal channel including a liquid electrolyte solution; and an electrochemical transducer in the channel; and an magnetohydrodynamic (MHD) calibrator.

In an embodiment of the seismometer, the electrochemical transducer comprises mesh electrodes such as at least two anodes and at least two cathodes which may be made of platinum separated by microporous spacers.

In an embodiment of the seismometer, magnetic poles of the MHD calibrator are generally parallel to the toroidal channel at the electrochemical transducer.

In an embodiment of the seismometer, the MHD calibrator is suitable for calibrating the sensor in a passband range of 100 seconds.

In an embodiment of the seismometer the MHD calibrator comprises rare earth magnets.

In an embodiment the seismometer further comprises a bulb in fluid communication with the toroidal channel, the bulb compensating for temperature expansion of the liquid electrolyte solution.

DESCRIPTION OF THE PREFERRED EMBODIMENT(S)

Figure 1:
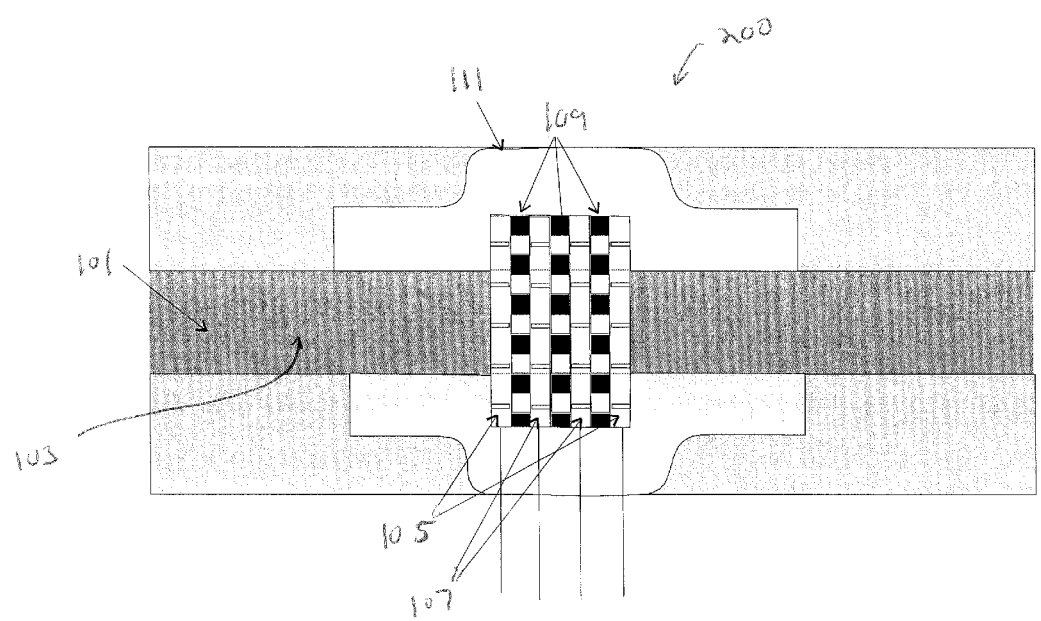
FIG. 1 provides a diagram of simplified sketch of an embodiment of a electrochemical transducer FIG. 2 provides a simplified sketch of an embodiment of an electrochemical rotational sensor.
Figure 2:
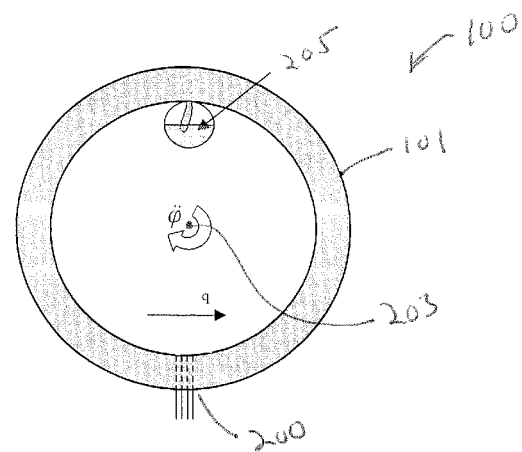

FIG. 2 provides an embodiment of a electrochemical rotational sensor (100) suitable for use as a seismometer. At the core of the sensor (100) is an electrochemical transducer (200), which is shown in detail in FIG. 1. The transducer (200) is generally contained in a channel (101) which is shown in both FIG. 1 and FIG. 2. The channel (101) is filled with a specially prepared electrolytic solution (103) such as, but not limited to, an iodine composition. The transducer (200) itself is formed from a plurality of fine mesh electrodes, in the depicted embodiment this comprises two anodes (105) and two cathodes (107) which are separated by a plurality of thin, microporous polymer spacers (109). Depending on embodiment, the electrodes can be made from any conducting material suitable for use with the electrolyte solution (103), but are preferably formed from noble metals such as, but not limited to, platinum. This stack of anodes (105), cathodes (107) and spacers (109) is tightly held together by a housing (111) which serves to hold the components in their relative positions and support them within the channel (101).

When an external motion is applied to the sensor (100), motion of the fluid solution (103) caused by the external acceleration is converted into an electrical signal by the flow of the solution (103) relative to the transducer (200). In the depicted embodiment, this is achieved by using the convective diffusion of the ions in the electrolyte solution (103).

When a small dc offset is applied between the anodes (105) and cathodes (107), the flow of ions of each type is given by the following expression:

$$j_a = -D \cdot \nabla c_a + q_a \cdot C_a \cdot \mu \cdot E \quad \text{(Equation 1)}$$

where D=diffusion coefficient, $\mu$=mobility, $c_a$=concentration of active ions, E=the electrical field vector. Since a strong electrolyte (103) is an excellent conductor, the electric potential drops rapidly in the vicinity of the electrodes (105) and (107), and there is generally no electric field, E, in the bulk of the solution (103). The second term in Equation 1 can, therefore, generally be ignored. Thus, the application of a bias voltage to the transducer (200) generally results only in a concentration gradient. This is in contrast both to conductors, in which the current is driven by the external electric field, and to semiconductors, in which both the field and the concentration gradient determine the currents.

An external acceleration, a, along the channel (101) creates a pressure differential, $\Delta P$, across the transducer (200), which forces the liquid solution (103) in motion with a volumetric velocity, v. This flow of electrolyte solution (103) entrains ions and causes an additional charge transfer between the electrodes (105) and (107) in accordance with Equation 2:

$$j'_a = v \cdot C_a \quad \text{(Equation 2)}$$

The total current from active ions, in the presence of acceleration, will thus be shown by Equation 3:

$$j_a = -D \cdot \nabla c_a + v \cdot c_a \quad \text{(Equation 3)}$$

The transducer (200) thus generates an electrical signal in response to an input motion. The symmetric geometry of the transducer cell (200) ensures its linear behavior over a wide range of input signals. With a highly concentrated electrolyte solution (103), the electric field is non-zero only in a narrow boundary layer adjacent to the electrodes (105) and (107). In this case, the electric current is essentially determined only by the diffusion.

In FIG. 2, the transducer cell (200) is incorporated into a toroid channel (101) which is completely filled with the liquid electrolyte solution (103). In this arrangement, no translational acceleration will put the fluid electrolyte solution (103) in motion. However, an angular acceleration imparted to the sensor (100) around the axis (203) of the toroid (201) will cause the liquid electrolyte solution (103) to move. This device is, therefore, effective for detecting rotational motion while generally being completely indifferent to any translational motion.

In the embodiment of FIG. 2, the rotational sensor (100) comprises the electrolyte solution (103) placed within the toroid channel (201) with at least one electrochemical transducer (200) located therein. There is also provided in this embodiment, a bulb (205) which serves to compensate for temperature expansion of the electrolyte solution (103). Such compensation inhibits damage to the channel (201) while also maintaining the channel (201) be filled with electrolyte solution (103). In practice, three or more rotational sensors (100) may be placed together in a single housing (at least one arranged in the x, y, and z coordinate planes) to provide for a resultant sensor which can measure rotational motion in any axis.

Electrochemical transducers (200) are generally characterized by a very high conversion coefficient of mechanical motion into electrical signal. Electrical noise therefore plays a generally smaller role in the total signal-to-noise ratio than in rotational sensors of the prior art. In addition, this also generally results in low power consumption, typically several times smaller than in any other rotational seismometers making them suitable for long-term installation and other uses where power consumption in a significant issue.

Rotational seismometers can have many applications. Depending on the specific application, lower self-noise or higher clip level specification may be required. Still further, many different passband specifications, from very low to higher frequencies, or flatter velocity responses may be required.

While the sensor (100) of FIG. 2 provides for excellent qualities in seismic measurements, it does have some potentially limiting qualities depending on its specific construction. In an embodiment, a sensor (100) may not provide great bandpass flexibility with some embodiments having only limited passband from 20 seconds to 20 Hz as well as limited dynamic range and clip level. In addition, each sensor (100) generally has to be individually calibrated on a special rotational shake-table, which means the sensor (100) cannot be checked or recalibrated in the field. This can be problematic when translational seismometers can have a calibration coil and input for such in-field checking.

Figure 5:
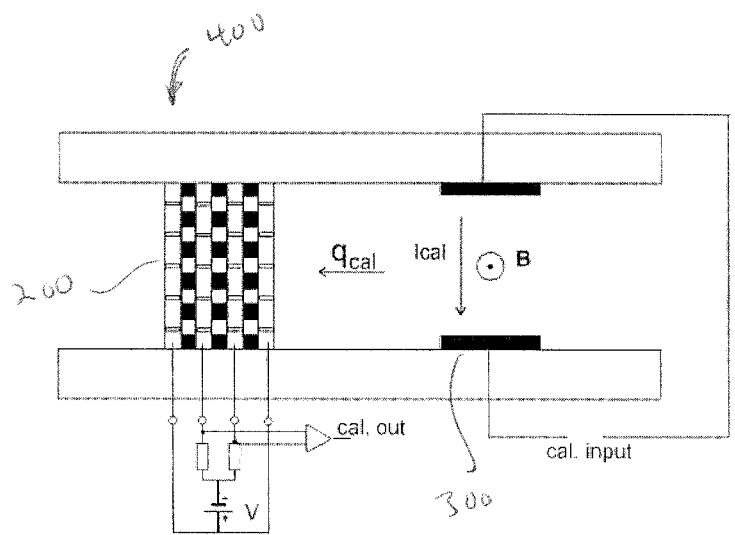
FIG. 5 provides an embodiment of a MHD cell added to an electrochemical transducer.

FIG. 5, therefore, provides an embodiment of a rotational seismometer (400) that has extended dynamic range, lower noise, higher clip-level by utilizing a smaller toroid and is equipped with the Magnetohydrodynamic (MHD) calibrator (300).

The power spectral density (PSD) of the self-noise of the electrochemical rotational seismometer (100) in terms of the angular acceleration $\ddot{\phi}$ can be described as shown in Equation 4:

$$\langle \dot{\varphi}^2 \rangle_\omega = \frac{2R_h kT}{(2\rho S)^2} \quad \text{(Equation 4)}$$

where S=effective area circumscribed by the sensor, $R_h$=hydraulic impedance of the sensor channel, k=Boltzmann's constant, ρ=electrolyte density, T=temperature.

Increasing the size of the sensor (100) substantially increases the packaging required, particularly when the sensor is used in a triaxial arrangement as contemplated previously. The clip level of an electrochemical rotational sensor (100) is limited by the nonlinearities in the transducer cell (200) which occur when the pressure differential of the electrolyte solution (103) across the cell (200) exceeds the certain limit sacrificing laminar flow. This pressure ΔP described as follows in Equation 5:

$$\Delta P = 2 \cdot \rho \cdot S \cdot \ddot{\varphi} \quad \text{(Equation 5)}$$

In order to reduce component size, reducing the sensor size (toroid diameter) by about ¼ gives a 4-fold (12 dB) increase of the clip level from about 0.1 to about 0.4 rad/sec. While improving portability, this would render the noise level overly high if the transducer cell (200) remains unchanged.

FIG. 5 provides an alternative embodiment of a sensor (400) with low hydraulic impedance $R_h$ and an MHD calibration cell (300). Reducing the size of the toroid, according to Equation 4, would affect the noise if the $R_h$ of the transducer cell (200) remained the same. Generally, the only limiting factors in the reduction of $R_h$ are the practical physical dimensions of the transducer cell (200) for manufacturing and use purposes and the size of the sensor itself. For a single channel (201) in the transducer cell (200), the hydraulic impedance can be found using the Poiseuille's expression, with l as the length of the cell, η is the electrolyte viscosity and R is the radius of the channel (201):

$$R_h = \frac{8 \cdot \eta \cdot l}{\pi \cdot R^4} \quad \text{(Equation 6)}$$

Since $R_h$ changes as the fourth power of the channel radius, significant potential for improving the resolution lies in achieving the maximum practically possible expansion of the channel cross-section (201). The sensor (400) has been found to have only 1/64 of the hydraulic impedance of the cell (200), which resulted in 6 dB noise reduction to $10^{-7}$ rad/sec RMS in the same passband. The total dynamic range extension is 18 dB.

Figure 3:
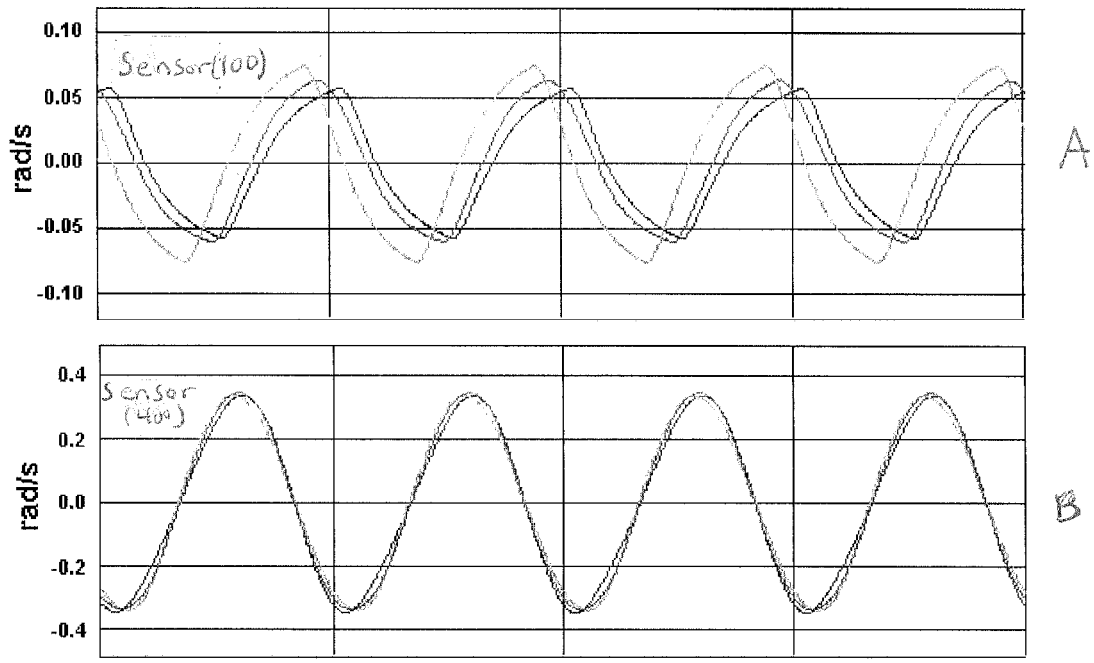
FIG. 3 provides a graph of outputs about clip level of a sensor of FIG. 2 (FIG. 3A) compared to sensor of FIG. 5 (FIG. 3B) (20 Hz sine wave)

Experimentally measured outputs of three sensors (100) close to their clip levels are shown in FIG. 3A and three sensors (400) with reduced toroid size also close to their clip levels are shown in FIG. 3B. The responses were obtained using rotational shake-table driven by a 20 Hz sine wave. As one can see from the picture, the sensors (400) produce good signals with about 2% THD at 0.35 rad/s, while the sensors (100) produce significantly distorted signals with THD>10% at only 0.06 rad/s. It is also worth mentioning that at high drive amplitudes sensors (400) have more identical response compared to sensors (100).

Figure 4:
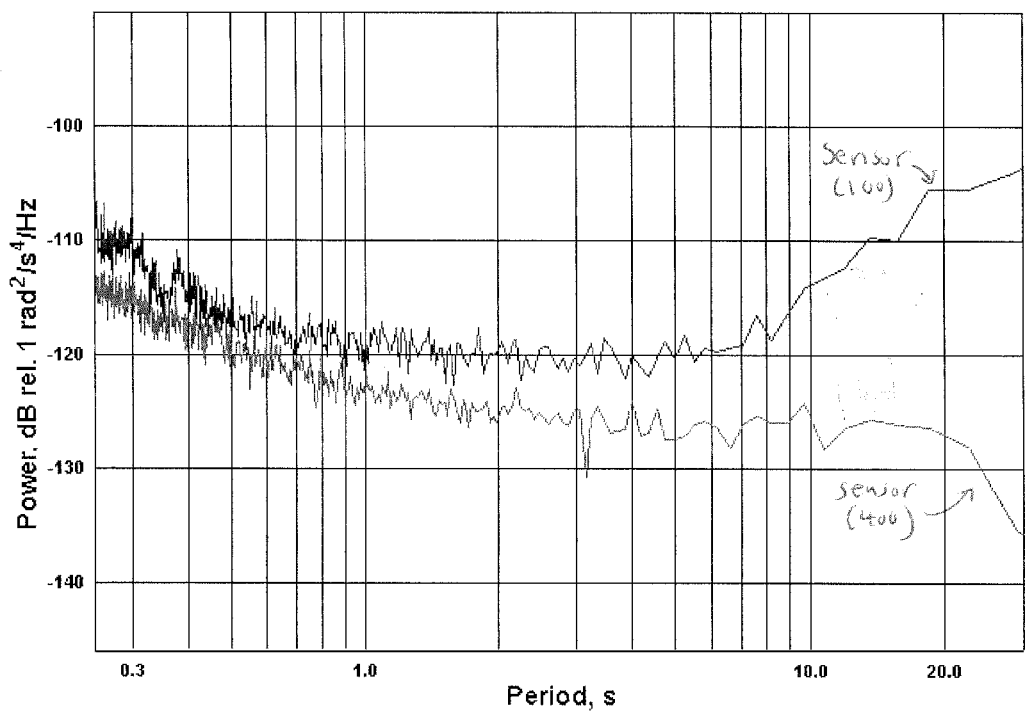
FIG. 4 provides a graph of self-noise of a sensor of FIG. 2 compared to a sensor of FIG. 5.

Experimentally measured power spectral density of the noise of a typical sensor (400) is shown in FIG. 4. The real noise improvement proved to be in accordance with theoretical calculations at mid-range periods. The short-period noise of the sensor (400) is found to be better or the same as of the sensor (100). The major noise reduction is observed at long periods and may be attributed to the lower noise electronics developed for the sensor (400).

The rotational seismometer (100), as discussed above, has been found to have a passband limited from 20 seconds to 20 Hz and each sensor has to be individually calibrated on a rotational shake-table. Extension of the range to 100 seconds or to 100 Hz would result in building a new rotational shake-table capable for calibration in the extended range. That shake-table has to have its mechanical resonance over 100 Hz while being capable to provide at least 5-fold increase of the magnitude at low frequencies compared to an old one. Currently, no known calibrator comes close to providing the required specs, nor is there any obvious design that even could.

Calibration of a very broad band (VBB) rotational seismometer (400) is provided via an alternative design as shown in FIG. 5. While most modern translational VBB seismometers equipped are with the calibration coil which eliminates the need of the shake-table and gives the user an option of checking the response in the field via calibration pulse which is implemented now in almost all digital recorders, a calibration coil and magnet could not be integrated into the sensor shown on a FIG. 2 to force the electrolyte into motion.

However there exists a close physical principle called the inverse magnetohydrodynamic (MHD) effect, whose action depends on the force applied to a current-carrying conductor in a magnetic field, with the electrolyte being the conductor. When a current I flows through the electrodes, the volume force, applied to the electrolyte is proportional to the vector product I×B where B is the magnetic induction. This force causes the ions in the electrolyte solution (103) to flow through the transducer cell (200), entraining the liquid as well. This flow $q_{cal}$ is essentially equivalent to that caused by the inertial forces and can be related to I and B via the following Equation 7:

$$q_{cal} = \frac{(B \times I_{cal})L}{sR_h} K \quad \text{(Equation 7)}$$

The proportionality coefficient, K, depends on various properties of the transducer, primarily the electrode configuration and the non-uniformity of the magnetic field, L is the distance between MHD electrodes and s is the cross-section of the electrolyte channel. FIG. 5 shows a simplified sketch of a rotational transducer (600) equipped with an MHD calibration cell (300). The sketch does not show the entire magnetic system (300) explicitly, since the magnet's poles are generally parallel to the drawing's plane and located in front of and behind it. However, the magnetic system (300) is represented by the magnetic field (300) in FIG. 5 using the symbol ⊙ to indicate that the field is directed toward the viewer. One of ordinary skill would understand from this depiction how to arrange a magnetic system (300) to generate the appropriate field.

Despite the apparent simplicity of the above Equation 7, it does not in itself prove that the required calibration force may be achieved using reasonable levels of the magnetic field and electric current. It is also unclear whether such MHD cell may be implemented subject to manufacturability and cost limitations. However, certain rare earth magnets can provide very strong local fields and such fields, in conjunction with currents of about several mA, are believed to generate forces equivalent to rotational velocity close to the projected clip level of the sensor (400) of FIG. 5.

Technical implementation of an MHD calibrator (300) is difficult since the MHD cell (300) and the electrochemical transducer (200) share the same volume of the electrolyte solution (103) which is generally a good conductor with very complex volt-ampere characteristics. To resolve this issue, a current generator that drastically reduces or eliminates any leakage currents between MHD cell (300) and the electrochemical transducer (200), as well as protects all electrodes from overvoltage that may lead to decomposition of the electrolyte, is preferred. Such a system allows extension of the sensor's (400) passband to 100 sec-100 Hz range and provides the rotational sensor (400) with the very accurate (1%) and simple calibration like the coil and magnet in translational seismometers.

Figure 6:
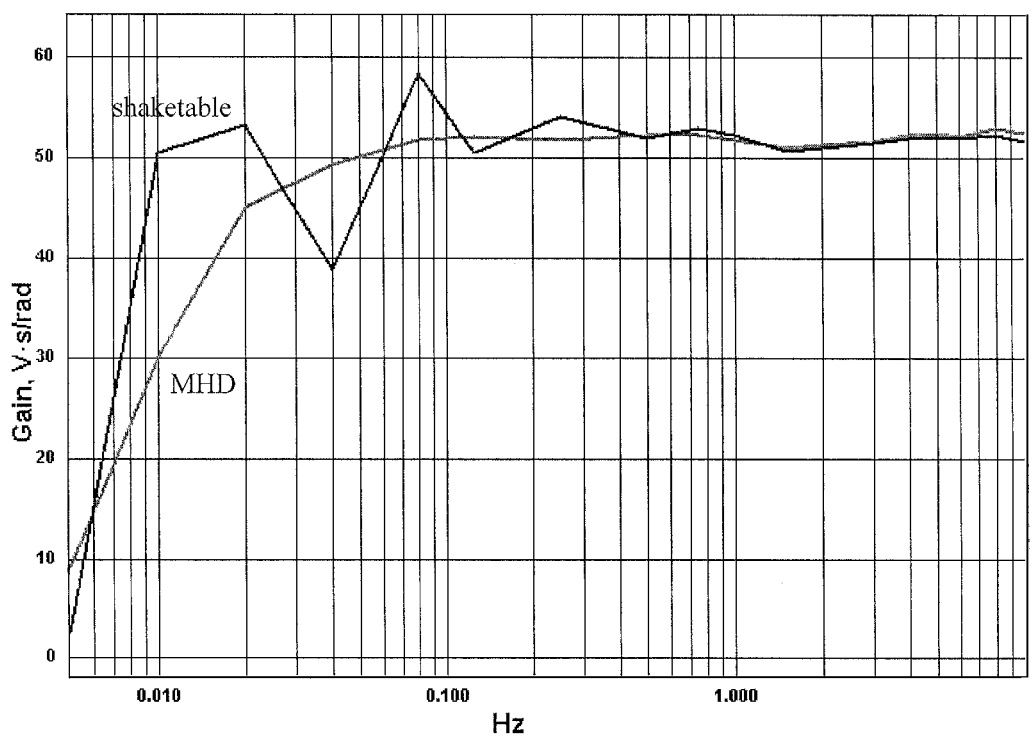
FIG. 6 provides a graph of a shake table calibration vs. MHD calibration.

A comparison of the calibration curves of a typical sensor (400) obtained from the shake table and MHD is shown in FIG. 6. As displayed from the graph, at 0.5 Hz and higher frequencies both methods of calibration give very close (within 1%) values of the gain of the sensor which proves that MHD calibration works and is at least as accurate as the shake table. On the other side, at 0.1 Hz and lower frequencies the shake table starts introducing calibration errors, the lower the frequency, the higher the error. This is primarily due to the fact that the shake table has limited angle of the rotation and cannot generate clean signals with the angular velocities above the levels of the ambient noise. And it is worth mentioning that any shake table adds the noise and parasitic signals which may affect the accuracy of measurements. On the contrary, MHD calibration is free from this limitation and is capable to generate very clean and strong signals even at longest periods, starting from DC.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A seismometer comprising:
    a rotational sensor comprising;
        a toroidal channel including a liquid electrolyte solution; and
        an electrochemical transducer in said channel; and
    a magnetohydrodynamic (MHD) calibrator.

2. The seismometer of claim 1 wherein said electrochemical transducer comprises mesh electrodes separated by microporous spacers.

3. The seismometer of claim 2 wherein said mesh electrodes comprise at least two anodes and at least two cathodes.

4. The seismometer of claim 2 wherein said mesh electrodes comprise platinum.

5. The seismometer of claim 1 wherein magnetic poles of said MHD calibrator are generally parallel to said toroidal channel at said electrochemical transducer.

6. The seismometer of claim 1 wherein said MHD calibrator is suitable for calibrating said sensor in a passband range of 100 seconds.

7. The seismometer of claim 1 wherein said MHD calibrator comprises rare earth magnets.

8. The seismometer of claim 1 further comprising a bulb in fluid communication with said toroidal channel, said bulb compensating for temperature expansion of said liquid electrolyte solution.

* * * * *